(12) United States Patent
Elangovan et al.

(10) Patent No.: US 10,732,723 B2
(45) Date of Patent: *Aug. 4, 2020

(54) LOCATION DETERMINATION AND REGISTRATION METHODOLOGY FOR SMART DEVICES BASED ON DIRECTION AND PROXIMITY AND USAGE OF THE SAME

(71) Applicant: Nod, Inc., Santa Clara, CA (US)

(72) Inventors: Anusankar Elangovan, San Francisco, CA (US); Jake Kesinger, Bath, ME (US)

(73) Assignee: NOD, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,395

(22) Filed: Nov. 20, 2017

(65) Prior Publication Data
US 2018/0329507 A1 Nov. 15, 2018

Related U.S. Application Data

(63) Continuation of application No. 14/629,360, filed on Feb. 23, 2015, now Pat. No. 9,823,749.

(60) Provisional application No. 61/943,290, filed on Feb. 21, 2014.

(51) Int. Cl.
| | |
|---|---|
| G09G 5/00 | (2006.01) |
| G06F 3/01 | (2006.01) |
| G06F 3/038 | (2013.01) |
| H04L 12/28 | (2006.01) |

(52) U.S. Cl.
CPC .............. *G06F 3/017* (2013.01); *G06F 3/038* (2013.01); *H04L 12/282* (2013.01); *H04L 12/2807* (2013.01); *G06F 2203/0384* (2013.01); *H04L 2012/2841* (2013.01)

(58) Field of Classification Search
CPC .. G06F 2203/0384; G06F 3/017; G06F 3/038; H04L 12/2807; H04L 12/282; H04L 2012/2841

See application file for complete search history.

(56) References Cited

U.S. PATENT DOCUMENTS

| | | |
|---|---|---|
| 2006/0129070 A1 | 6/2006 | Pearl |
| 2006/0031512 A1 | 7/2006 | Shibasaki |
| 2007/0263001 A1 | 11/2007 | Trzecieski |
| 2008/0031512 A1 | 2/2008 | Mundermann |

(Continued)

FOREIGN PATENT DOCUMENTS

WO 2012099584 7/2012

*Primary Examiner* — Insa Sadio
(74) *Attorney, Agent, or Firm* — Pillsbury Winthrop Shaw Pittman LLP

(57) ABSTRACT

Described methods and apparatus for a location determination and registration methodology for smart devices that involves creating a registration map of a bounded space, with various smart devices located therein in fixed positions, and for each smart device relative positions in which a gestural input device can communicate with it, and relative distances, signal strengths and the like associated therewith for each smart device being part of the registration map. Once created, the registration map can be used to allow for a particular smart device to communicate with the gestural input platform when that is intended and the two are properly oriented relative to each other.

23 Claims, 3 Drawing Sheets

(56) References Cited

U.S. PATENT DOCUMENTS

| | | |
|---|---|---|
| 2008/0091373 A1 | 4/2008 | McGibbon |
| 2010/0164862 A1 | 7/2010 | Sullivan |
| 2011/0213664 A1 | 9/2011 | Osterhout et al. |
| 2011/0298827 A1 | 12/2011 | Perez |
| 2012/0019373 A1 | 1/2012 | Kruse |
| 2012/0093320 A1 | 4/2012 | Flaks |
| 2012/0194645 A1 | 8/2012 | Fuller |
| 2012/0212484 A1 | 8/2012 | Haddick et al. |
| 2012/0249590 A1 | 10/2012 | Maciocci |
| 2012/0249741 A1* | 10/2012 | Maciocci ................ G06F 3/011 348/46 |
| 2012/0319940 A1 | 12/2012 | Bress et al. |
| 2012/0327194 A1 | 12/2012 | Shiratori |
| 2013/0222232 A1 | 8/2013 | Kong |
| 2013/0328878 A1* | 12/2013 | Stahl .................... G06F 3/1431 345/428 |
| 2014/0055352 A1 | 2/2014 | Davis |
| 2014/0139422 A1 | 5/2014 | Mistry |
| 2014/0282274 A1 | 9/2014 | Everitt |
| 2014/0282275 A1 | 9/2014 | Everitt |
| 2015/0077336 A1 | 3/2015 | Elangovan |
| 2015/0084840 A1 | 3/2015 | Kim |
| 2015/0241969 A1 | 8/2015 | Elangovan |

\* cited by examiner

LOCATION DETERMINATION AND REGISTRATION METHODOLOGY FOR SMART DEVICES BASED ON DIRECTION AND PROXIMITY AND USAGE OF THE SAME

RELATED APPLICATION

The present application is a continuation of U.S. patent application Ser. No. 14/629,360, filed Feb. 23, 2015, which claims priority to U.S. Provisional Application Ser. No. 61/943,290 filed on Feb. 21, 2014, the contents of both of which are incorporated herein by reference in their entirety.

FIELD OF THE ART

This disclosure relates to a location determination and registration methodology for smart devices based on direction and proximity.

BACKGROUND

Discriminating between multiple different controllable devices, also referred to as smart devices, that are disposed within a bounded space is conventionally implemented using a one-to-one mapping, where each controllable device is uniquely paired with a controller, such as a remote control device that controls a television, and in use the user points the controller at the television to allow communication there between on a predetermined communication channel.

In certain instances, a single controller can control multiple smart devices if programmed to do so, such as a single remote control device controlling both a television and a stereo. In use, that particular device for which it is desired to control, such as the television or the stereo, is selected on the remote control device, and the user then points the remote control device to the selected smart device, with different control channels typically being used to communicate with each different controllable device.

As is evident, wireless control of smart devices is significantly limited.

SUMMARY

Described are apparatus and methods for a location determination and registration methodology for smart devices based on direction and proximity.

In particular are described methods and apparatus for a location determination and registration methodology for smart devices that involves creating a registration map of a bounded space, with various smart devices located therein in fixed positions, and for each smart device relative positions in which a gestural input device can communicate with it, and relative distances, signal strengths and the like associated therewith for each smart device being part of the registration map. Once created, the registration map can be used to allow for a particular smart device to communicate with the gestural input platform when that is intended and the two are properly oriented relative to each other.

DETAILED DESCRIPTION OF THE PREFERRED EMBODIMENTS

A typical user of a wearable gestural input platform, such as a sensor ring, could have multiple connected (smart) devices in his/her environment. These could be, for example, a smart lamp, a thermostat, a door lock, a smart TV, a garage door opener, etc., each of which contains therein some type of simple controller and wireless sensor that allows for wireless communication. Such a gestural input platform is described in previously filed U.S. Provisional Application No. 61/877,933 filed Sep. 13, 2013 and entitled "Methods and Apparatus for using the Human Body as an Input Device", which is attached hereto as Attachment 1 and explicitly incorporated herein by reference.

Figure 1:
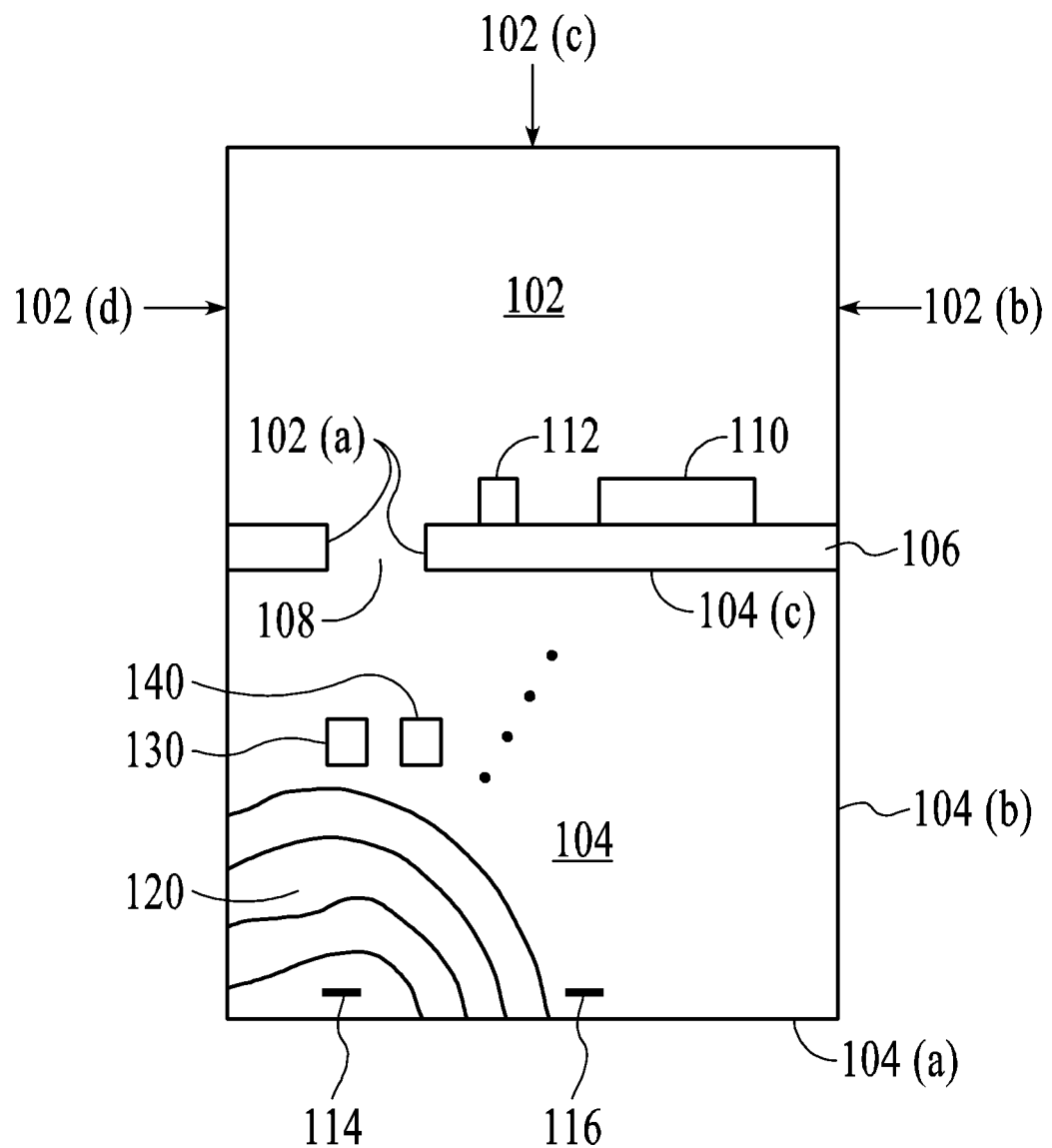
FIG. 1 illustrates a bounded space and devices therein within which the embodiments described operate.

Described herein is a methodology for an initial location determination and registration of various different such smart devices located within a bounded space and fixed in location therein, so that each smart device can subsequently communicate with the gestural input platform when the two are properly oriented relative to each other. An example of a bounded space 100 is illustrated in FIG. 1, which includes room 102 with walls 102(a-d) and room 104 with walls 104(a-d), sharing a common wall 106, and there being a doorway 108 between them.

On one wall 102a is a smart television 110 and a smart light switch 112. On one wall 104a is a smart thermostat 114 and a smart light switch 116. Of course other combinations are possible and this is only exemplary. Apparent, however, is that within this bounded area, each of these smart devices is in a relatively fixed location. Also shown in FIG. 1 is the rangefinder 130, along with the gestural input platform device 140, both of which are shown as being moved in expanding arcs 120 around the smart device 114, in order to accomplish the registration as described further herein.

The methodology 200, described with reference to FIG. 2, creates a map of the bounded space that includes the fixed location of each of the smart devices therein, which map is stored and can be accessed to allow the gestural input platform to "remember" the location/direction of the smart device for future use.

The steps involved in the location determination and registration include:

a) In step 210, download a software application, described hereinafter, to the user's smartphone or tablet or other device that preferably also has a camera capable of capturing video/still images and also has a compass (magnetometer) as one of its built-in sensors, herein referred to as a rangefinder when used for this purpose.

b) Establish, in step 220, a range of locations within the bounded area from where the user would normally interact with each smart connected device. This range of locations would incorporate a certain distance to the smart connected device as well as a range of angles (0° to 360°) around the smart connected device, if applicable given the constraints of the bounded space.

c) While holding the rangefinder and also wearing an activated gestural input platform, the user in step 230 moves through a range of locations associated with each smart connected device.

There are several events happening in parallel during the location registration process of step 230, including:

(i) Visible/obvious to the user—recording of the images and video while consistently pointing the rangefinder at the smart device, and optionally recording of the focal length between the camera and the smart device.

(ii) Not visible to the user—recording of the relative signal (Wi-Fi, Bluetooth, or similar) strength of the smart connected device to the wearable gestural input platform and/or rangefinder, and also recording of the direction of the connected device relative to the user, as measured by the compass on the rangefinder or the wearable gestural input platform.

It is the latter [(ii)] that is primarily used to establish the relative location (direction and proximity) of the connected device and the information may be stored on the non-volatile memory (NVM) of the gestural input platform for future use. This information may also be stored on other user devices, such as the user's smartphone, tablet, laptop or other device, and may also be uploaded to a remote server/location ("the cloud") for safekeeping and future retrieval.

During the initial location registration process 200, the rangefinder that is recording the images/video is in one specific embodiment the primary source for recording the relative signal strength and compass data, relative to the connected (smart) device, with the gestural input platform being a secondary source for collecting the same data and providing a means of verification. In another specific embodiment, the primary source for recording the relative signal strength and compass data is the gestural input platform, with the rangefinder being the secondary source.

Figure 3:
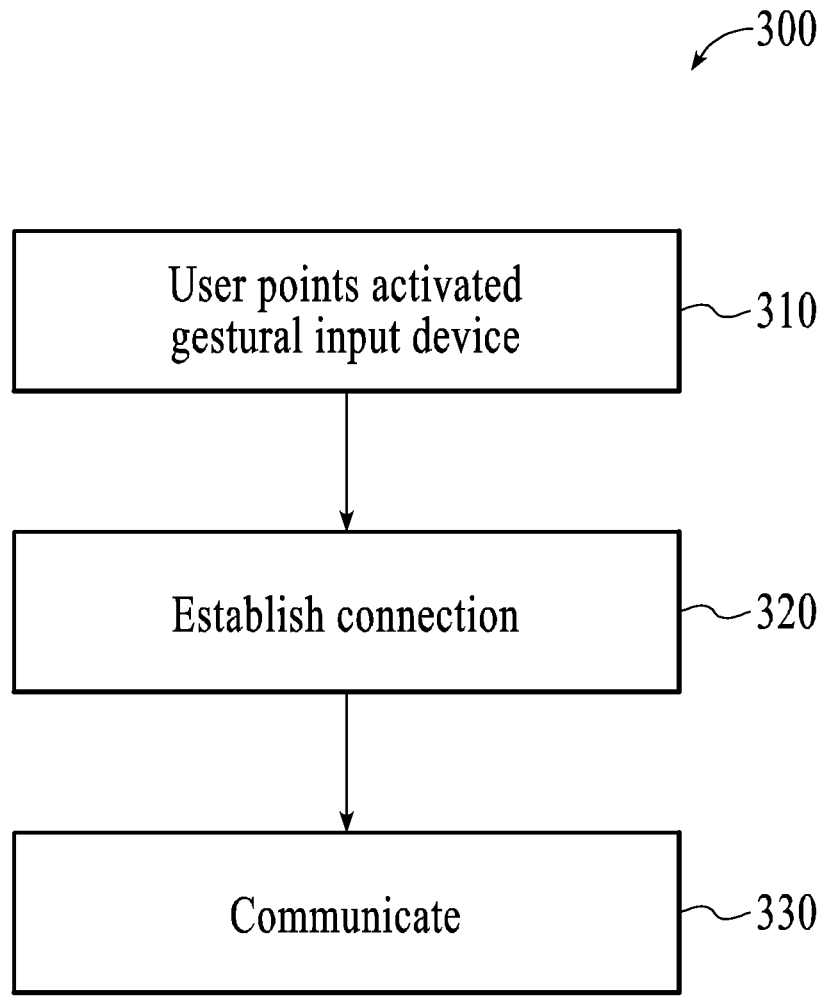
FIG. 3 illustrates a flowchart showing usage of the embodiments described herein after establishment of the mapping according to FIG. 2.

Once the initial location registration process 200 is completed, when the user wearing an activated gestural input platform is within the bounded area, the usage process 300 shown in FIG. 3 occurs. The user points to or conducts an equivalent gesture to interact with a particular connected (smart) device in step 310, the activated gestural input platform in step 320 establish which specific smart device is intended to be interacted with and thus connected to based on the compass and/or relative signal strength intensity values measured and compared to the stored (known) values and/or focal length or image matching/pattern recognition if the gestural input device include the capability of taking images. This enables the gestural input platform to thereafter interact with the smart device in step 330, based on predetermined user gestures.

It is understood that this usage process 300 can have more complex schemes than the one described with respect to FIG. 3. For example, if an initial connection is to an unintended device, then the connection scheme can include a user override capability triggering a disconnection of the smart device to which there was an undesired connection made. Further, time of day, time of year, outside temperature and other factors can also be monitored and used in determining to which smart device a user is intended to connect during usage.

One benefit of such a registration method is that it enables control of smart devices that may not necessarily share the same connection protocol as is available on the gestural input platform. For instance, the gestural input platform may only communicate over Bluetooth and the smart device may only communicate over Wi-Fi. In such an instance, when the user wants to interact with a smart device (based on direction/proximity) known to have a different communication protocol, both the gestural input platform and the smart device can connect to a smartphone/tablet/other device that shares both communication protocols, with the gestural input platform initiating an intended action over Bluetooth that is then be relayed over Wi-Fi to the smart device, resulting in the desired action, for example.

Figure 2:
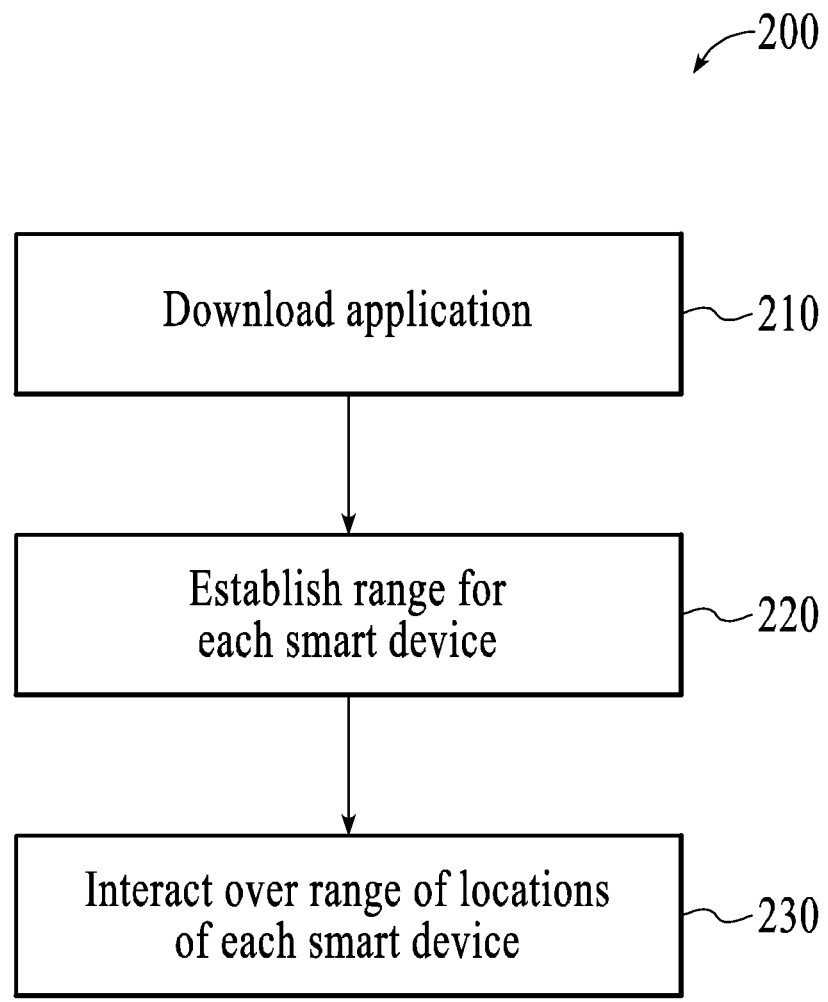
FIG. 2 illustrates a flowchart showing creation of the mapping according to embodiments described herein.

Referred to above was the software application for downloading into the rangefinder, mentioned in step 210 of FIG. 2. This software application includes software instructions that coordinate the compass coordinates of the rangefinder along with the visual images obtained from the camera as well as the signal strengths detected from the smart device being examined for each different smart device that is located within the bounded area. The user could further "label" each device for reference, e.g., thermostat, lights, etc. as well as establish, store and possibly modify the gestures/touch/tactile inputs associated with the control of that particular device. e.g., a gesture of raising/lowering the fingers could be associated with turning up/down the intensity of a smart lamp. This determines the anticipated behavior of the user with any particular device, so that the gestural input platform is on the lookout for certain gestures when interacting with specific devices.

Location is determined by, triangulation utilizing proximity (as measured by the signal strength amplitude) and relative orientation (as measured in angles). This computation can happen on the gestural input platform or on the software application.

As an enhancement to the location registration procedure, the relative strength intensity and/or direction can be re-recorded every time the user interacts with a particular smart device and appended to the baseline data set. This effectively keeps the values current and also fine-tunes for actual usage locations. It also allows one to account for any additional signals (noise) being introduced into the environment over time. In another embodiment, the user stores the images/video on their smartphone/tablet/other device and can choose to store the content in the cloud and provide access to the app provider for better location determination and registration, which would be achieved via building an accurate 3D map/layout of the user's interactive environment, based on the images recorded.

Although the present inventions are described with respect to certain preferred embodiments, modifications thereto will be apparent to those skilled in the art.

What is claimed is:

1. A method of interacting a wearable sensor device with a plurality of wirelessly connected electronic devices within a bounded area in an interior of a building through a controllable device, the wearable sensor device including one or more sensors and being sized for wearing on the human body, each of the one or more sensors emitting sensor data to the controllable device, and wherein the controllable device includes a detection unit that operates upon the sensor data to determine a pose of at least the portion of the human body and is capable of interacting with the controllable device, the detection unit including a detection processor, automatically operating under software control, that inputs, aggregates and fuses the sensor data from each of the one or more sensors to determine the pose of at least the portion of the human body based upon a locality of said one or more sensors, the method comprising the steps of:

determining a bounded area within the interior of the building that contains the plurality of wirelessly connected electronic devices;

creating a mapping for usage by the controllable device of the bounded space that includes, for each of a plurality of positions of the wearable sensor device within the bounded space, baseline mapping data that provides a direction and proximity of the wearable sensor device to each of the plurality of wirelessly connected electronic devices from each of the plurality of positions when the wearable sensor device is pointed at one of the plurality of wirelessly connected electronic devices, wherein the baseline mapping data includes at least one of visual images, rangefinder readings, and wireless signal strength;

after creation of the mapping, selecting the particular one of the plurality of wirelessly connected electronic devices for interaction based upon the baseline mapping data and a current position of the wearable sensor device within the bounded area, and using the wearable sensor device to interact with the particular one of the plurality of wirelessly connected electronic devices based upon predetermined user gestures that are identified based upon the sensor data from the wearable sensor device, wherein the baseline mapping data includes at least two of visual images, rangefinder readings and wireless signal strength, and wherein every time the wearable sensor device interacts with the particular one of the plurality of wirelessly connected devices, further mapping data is appended to the baseline mapping data that corresponds to the particular one of the plurality of wirelessly connected devices.

2. A method of interacting a wearable sensor device with a plurality of wirelessly connected electronic devices within a bounded area in an interior of a building through a controllable device, the wearable sensor device including one or more sensors and being sized for wearing on the human body, each of the one or more sensors emitting sensor data to the controllable device, and wherein the controllable device includes a detection unit that operates upon the sensor data to determine a pose of at least the portion of the human body and is capable of interacting with the controllable device, the detection unit including a detection processor, automatically operating under software control, that inputs, aggregates and fuses the sensor data from each of the one or more sensors to determine the pose of at least the portion of the human body based upon a locality of said one or more sensors, the method comprising the steps of:

determining a bounded area within the interior of the building that contains the plurality of wirelessly connected electronic devices;

creating a mapping for usage by the controllable device of the bounded space that includes, for each of a plurality of positions of the wearable sensor device within the bounded space, baseline mapping data that provides a direction and proximity of the wearable sensor device to each of the plurality of wirelessly connected electronic devices from each of the plurality of positions when the wearable sensor device is pointed at one of the plurality of wirelessly connected electronic devices, wherein the baseline mapping data includes at least one of visual images, rangefinder readings, and wireless signal strength;

after creation of the mapping, selecting the particular one of the plurality of wirelessly connected electronic devices for interaction based upon the baseline mapping data and a current position of the wearable sensor device within the bounded area; and using the wearable sensor device to interact with the particular one of the plurality of wirelessly connected electronic devices based upon predetermined user gestures that are identified based upon the sensor data from the wearable sensor device, wherein every time the wearable sensor device interacts with the particular one of the plurality of wirelessly connected devices, further mapping data is appended to the baseline mapping data that corresponds to the particular one of the plurality of wirelessly connected devices.

3. A method of interacting a wearable sensor device with a plurality of wirelessly connected electronic devices within a bounded area in an interior of a building through a controllable device, the wearable sensor device including one or more sensors and being sized for wearing on the human body, each of the one or more sensors emitting sensor data to the controllable device, and wherein the controllable device includes a detection unit that operates upon the sensor data to determine a pose of at least the portion of the human body and is capable of interacting with the controllable device, the detection unit including a detection processor, automatically operating under software control, that inputs, aggregates and fuses the sensor data from each of the one or more sensors to determine the pose of at least the portion of the human body based upon a locality of said one or more sensors, the method comprising the steps of:

determining a bounded area within the interior of the building that contains the plurality of wirelessly connected electronic devices;

creating a mapping for usage by the controllable device of the hounded space that includes, for each of a plurality of positions of the wearable sensor device within the bounded space, baseline mapping data that provides a direction and proximity of the wearable sensor device to each of the plurality of wirelessly connected electronic devices from each of the plurality of positions when the wearable sensor device is pointed at one of the plurality of wirelessly connected electronic devices, wherein the baseline mapping data includes at least one of visual images, rangefinder readings, and wireless signal strength;

after creation of the mapping, selecting the particular one of the plurality of wirelessly connected electronic devices for interaction based upon the baseline mapping data and a current position of the wearable sensor device within the bounded area; and using the wearable sensor device to interact with the particular one of the plurality of wirelessly connected electronic devices based upon predetermined user gestures that are identified based upon the sensor data from the wearable sensor device, wherein after the step of selecting, when the one of the plurality of wirelessly connected electronic devices is an unintended device, further including the steps of:

triggering a disconnection with the one of the plurality of wirelessly connected electronic devices; and performing the step of selecting again so that an intended device becomes selected.

4. The method according to claim 2, wherein the baseline mapping data includes at least two of visual images, rangefinder readings and wireless signal strength.

5. The method according to claim 4, wherein the mapping includes a wireless protocol that is used between the wearable sensor device and the controllable device and between the controllable device and each of the plurality of wirelessly connected electronic devices.

6. The method according to claim 5, wherein a first wireless protocol that is used between the wearable sensor device and the controllable device is different than a second wireless protocol used between the controllable device and one of the plurality of wirelessly connected electronic devices.

7. The method according to claim 6, wherein the first wireless protocol is Bluetooth and the second wireless protocol is Wi-Fi.

8. The method according to claim 2, wherein the mapping includes a wireless protocol that is used between the wearable sensor device and the controllable device and between the controllable device and each of the plurality of wirelessly connected electronic devices.

9. The method according to claim 8, wherein a first wireless protocol that is used between the wearable sensor device and the controllable device is different than a second wireless protocol used between the controllable device and one of the plurality of wirelessly connected electronic devices.

10. The method according to claim 9, wherein the first wireless protocol is Bluetooth and the second wireless protocol is Wi-Fi.

11. The method according to claim 2, wherein the baseline mapping data includes each of visual images, rangefinder readings and wireless signal strength.

12. The method according to claim 2, wherein after the step of selecting, if the one of the plurality of wirelessly connected electronic devices is an unintended device, further including the steps of:
 triggering a disconnection with the one of the plurality of wirelessly connected electronic devices; and
 performing the step of selecting again so that an intended device becomes selected.

13. The method according to claim 2, wherein the plurality of positions in the step of creating include those where the wearable sensor device will normally be disposed when interacting with each of the plurality wirelessly connected electronic devices.

14. The method according to claim 3, wherein the baseline mapping data includes at least two of visual images, rangefinder readings and wireless signal strength.

15. The method according to claim 14, wherein the mapping includes a wireless protocol that is used between the wearable sensor device and the controllable device and between the controllable device and each of the plurality of wirelessly connected electronic devices.

16. The method according to claim 15, wherein a first wireless protocol that is used between the wearable sensor device and the controllable device is different than a second wireless protocol used between the controllable device and one of the plurality of wirelessly connected electronic devices.

17. The method according to claim 16, wherein the first wireless protocol is Bluetooth and the second wireless protocol is Wi-Fi.

18. The method according to claim 3, wherein the mapping includes a wireless protocol that is used between the wearable sensor device and the controllable device and between the controllable device and each of the plurality of wirelessly connected electronic devices.

19. The method according to claim 18, wherein a first wireless protocol that is used between the wearable sensor device and the controllable device is different than a second wireless protocol used between the controllable device and one of the plurality of wirelessly connected electronic devices.

20. The method according to claim 19, wherein the first wireless protocol is Bluetooth and the second wireless protocol is Wi-Fi.

21. The method according to claim 3, wherein every time the wearable sensor device interacts with the particular one of the plurality of wirelessly connected devices, further mapping data is appended to the baseline mapping data that corresponds to the particular one of the plurality of wirelessly connected devices.

22. The method according to claim 3, wherein the baseline mapping data includes each of visual images, rangefinder readings and wireless signal strength.

23. The method according to claim 3 wherein the plurality of positions in the step of creating include those where the wearable sensor device will normally be disposed when interacting with each of the plurality wirelessly connected electronic devices.

* * * * *